(No Model.)
H. McMANUS.
APPARATUS FOR TREATING REFUSE FROM OIL REFINERIES.
No. 305,097. Patented Sept. 16, 1884.
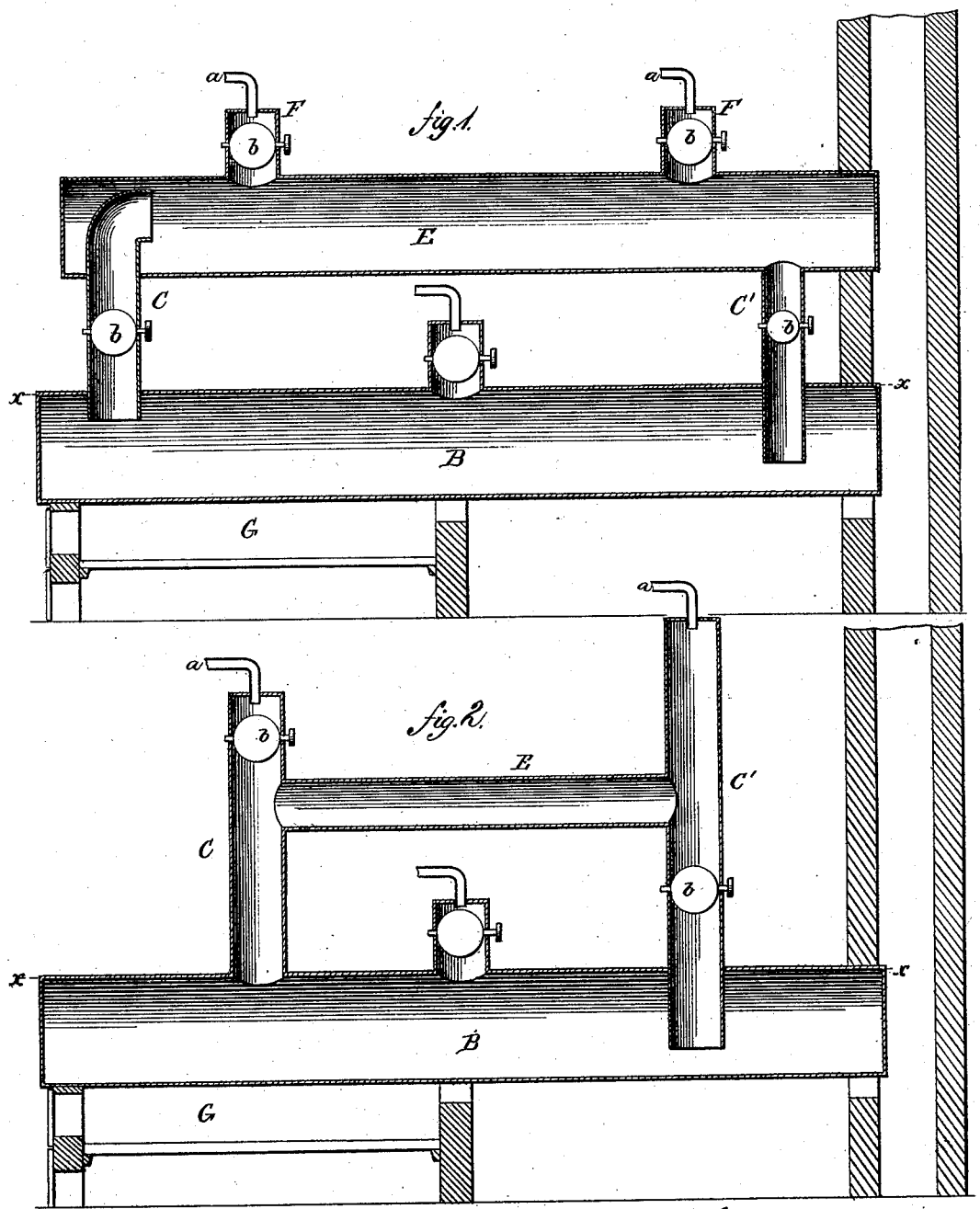

UNITED STATES PATENT OFFICE.

HENRY McMANUS, OF BROOKLYN, NEW YORK.

APPARATUS FOR TREATING REFUSE FROM OIL-REFINERIES.

SPECIFICATION forming part of Letters Patent No. 305,097, dated September 16, 1884

Application filed April 11, 1884. (No model.)

*To all whom it may concern:*

Be it known that I, HENRY MCMANUS, a citizen of the United States, residing at Brooklyn, in the county of Kings and State of New York, have invented certain new and useful Improvements in Apparatus for Treating Refuse from Oil-Refineries, of which the following is a specification.

The object of my invention is to utilize the waste product from coal-oil and petroleum refineries known as "sludge," and which is ordinarily discharged into streams, water-courses, or the ocean. The heavy matter of the sludge sinks and settles upon the bottom, effectually exterminating the oysters and other shell-fish, and destroying the fish-spawn. The lighter matter contains more or less spent oil, in combination with sulphuric acid, which floats and throws off noisome vapors of an extremely offensive odor, and is a nuisance not only to the people on the neighboring shores but to the shipping as well, and is especially annoying to yachts and other low-lying vessels. I have succeeded in producing a heavy hydrocarbon oil suitable for lubricating and other purposes, by subjecting the sludge to heat in an apparatus constructed to permit a free circulation, and thorough and uniform heating of the material, however thick and viscid it may be, and regardless of the extent to which it may foam.

Figure 1 of the drawings shows one form of apparatus embodying my invention, and Fig. 2 shows the same somewhat modified.

The apparatus consists of a hollow vessel or tank, B, which is heated either by an external furnace, G, below the same, as shown, or by interior steam-coils, or otherwise, a second vessel, E, and circulating-pipes C C', the former extending from the top of the vessel B to near the top of the vessel E, and the latter from the bottom of the vessel E to near the bottom of the vessel B. On the vessel E are one or more domes, F F, from which pipes *a* lead to condensing-worms, and the vessel B is sometimes provided with a similar dome and pipe leading to a worm. Valves *b* are arranged at proper points to control circulation and cut out any of the worms, as may be desired.

The sludge is placed in the apparatus to the height of the line *x*, and the heat is applied to the vessel B, when there will be a circulation upward through the pipe C, and downward through the pipe C', and along both vessels.

It will be seen that the passages are of comparatively great diameter as regards the size of the vessels, so that the circulation is not impeded, and so that as soon as the material begins to foam it can rise freely and pass over to the upper vessel, where there is ample opportunity for the foam to break and settle. By continued circulation the entire mass is gradually brought to a uniform heat, and the contained volatile portions are vaporized and separated, the gases passing through the pipes *a* to the worms, and being then condensed in the form of a thick hydrocarbon oil, which may be utilized like other heavy hydrocarbons.

The vessel E may be in the form of a tube or pipe connecting the pipes C C', as shown in Fig. 2.

By constructing the apparatus with circulating-pipes to compel circulation, and providing it with a large upper receptacle or tank, the gradual heating and effective separation of the gases are secured, however thick and adhesive the material may be, while the foaming presents no obstacle to the circulation or separation of the volatile portions.

The vessels and circulating-pipes may be of any desired form, arrangement, and dimensions, provided they are arranged to secure the circulation and permit foaming without obstructing the passages.

I claim—

The combination, with a lower vessel having a heating apparatus connected thereto, of an upper vessel, a pipe leading from the upper part of the lower to the upper part of the upper vessel, a pipe leading from the lower part of the upper to the lower part of the lower vessel, and pipes leading from both vessels to the condensers, substantially as described.

In testimony whereof I have signed my name to this specification in the presence of two subscribing witnesses.

HENRY McMANUS.

Witnesses:
 CHARLES E. FOSTER,
 A. E. T. HANSMANN.